Nov. 5, 1929.  A. J. BAYLEY  1,734,709
FRONT WHEEL DRIVE
Filed July 28, 1926  3 Sheets-Sheet 2
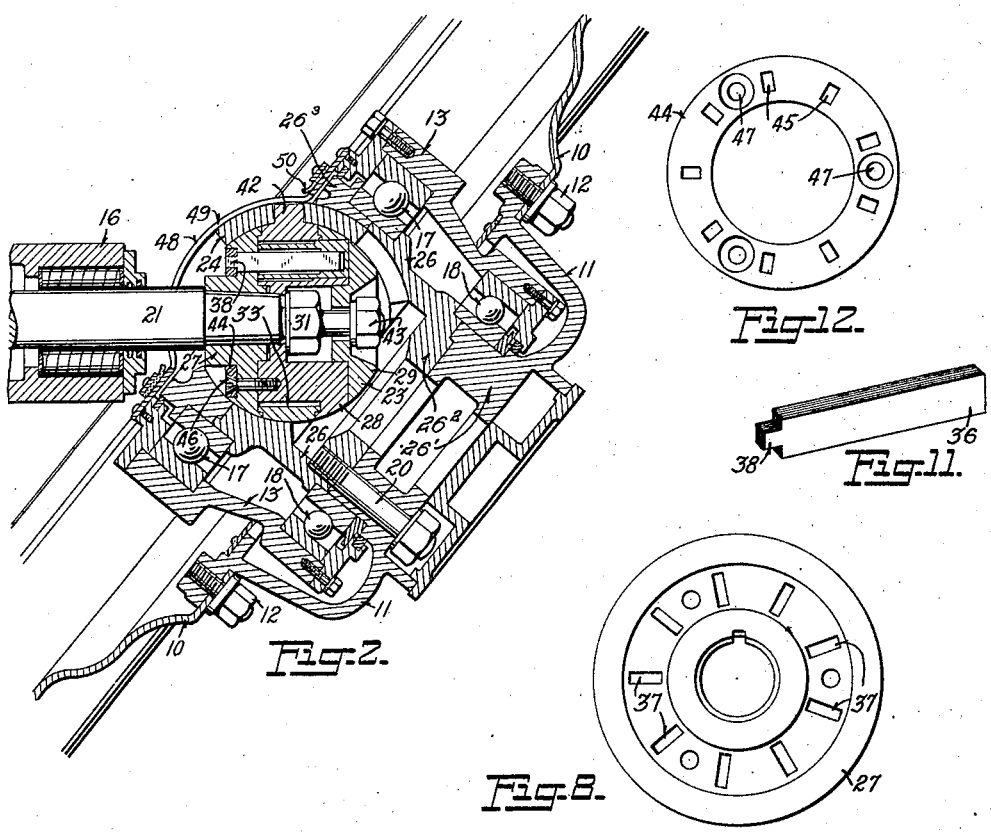
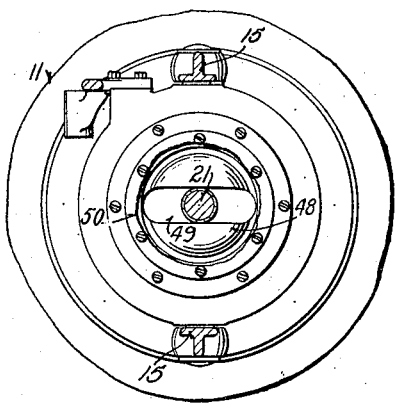
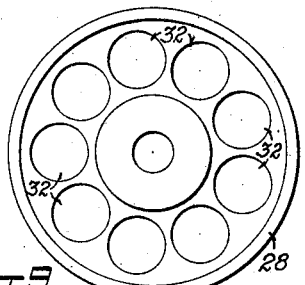
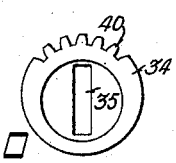
INVENTOR
ARTHUR J. BAYLEY
BY
Ralph W. Brown
ATTORNEY Nov. 5, 1929.   A. J. BAYLEY   1,734,709
FRONT WHEEL DRIVE
Filed July 28, 1926   3 Sheets-Sheet 3
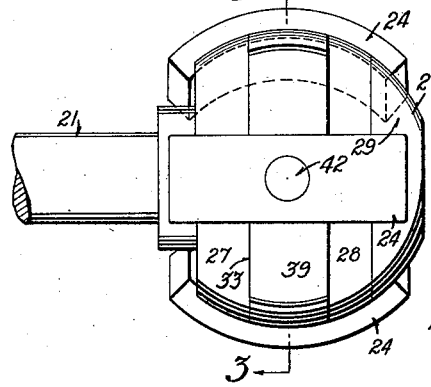
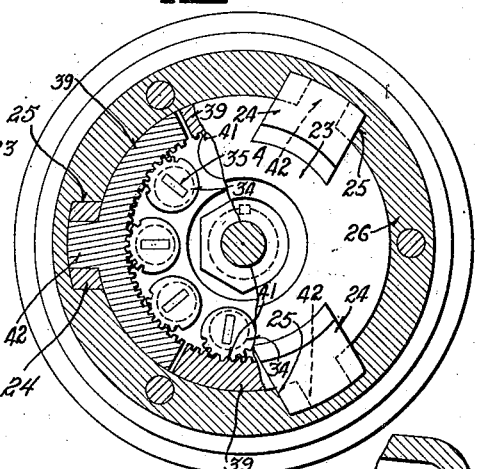
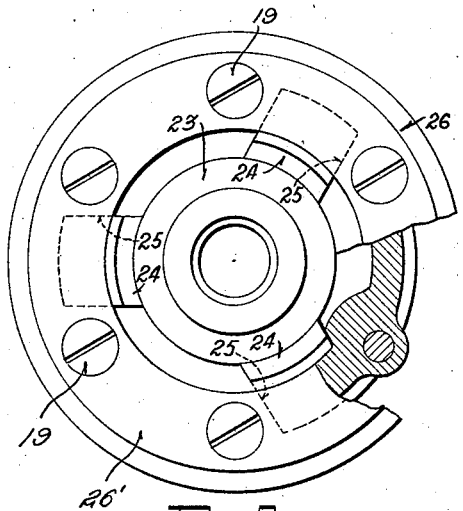
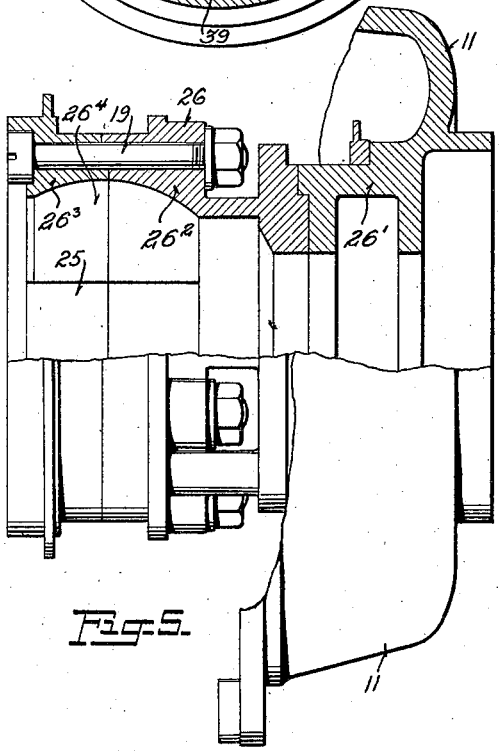
INVENTOR
*Arthur J. Bayley.*
BY
ATTORNEY Patented Nov. 5, 1929

1,734,709

UNITED STATES PATENT OFFICE

ARTHUR J. BAYLEY, OF MILWAUKEE, WISCONSIN

FRONT-WHEEL DRIVE

Application filed July 28, 1926. Serial No. 125,387.

This invention relates primarily to front wheel drives for motor vehicles although the novel features thereof may be applied to advantage in other drives permitting an angular displacement between the axes of rotation of the driving and driven parts.

The various types and forms of universal joints heretofore employed in drives of the character mentioned have not proven entirely successful, due to an inability to transmit a smooth torque to the driven part. With the axes of rotation of the driving and driven parts angularly disposed relative to each other, the elements of either part follow a true circular path with reference to the axis of rotation of that part, but with reference to the axis of rotation of the other part the path of these elements is somewhat elliptical. In other words an element on one part in traveling about the axis of rotation thereof approaches and recedes from the axis of rotation of the other part, and a positive engagement between the coacting elements of the driving and driven parts produces a corresponding irregular motion, which increases as the angular relation between the axes increase. Furthermore this peculiar motion produces a cramping action between the coacting elements of the driving and driven parts, with the result that no front wheel drive mechanism heretofore designed will permit swinging of the front wheel through more than a very limited angle.

One object of the present invention is the provision of a drive mechanism for the purpose mentioned which shall be free from the above mentioned objections and limitations. This I accomplish by an arrangement of parts which will permit an automatic adjustment between the coacting elements of the driving and driven parts to compensate for the peculiar motion and consequent irregularities hereinabove mentioned. I have found that a front wheel drive mechanism constructed in accordance with the present invention will permit an adjustment of the front wheel through an angular range of eighty degrees without binding or cramping and with no appreciable irregularities in the transmitted torque.

Other objects and advantages will appear from the following description of an illustrative embodiment of the present invention.

In the drawings:

Fig. 2 is a horizontal sectional view illustrating the positions of the parts with the wheel swung through a wide angle for steering purposes.

Fig. 3 is a side elevation of the driving head.

Fig. 4 is a transverse sectional view through the hub with parts appearing in elevation.

Fig. 5 is a fragmentary longitudinal sectional view through the hub with the driving head removed.

Figure 1:
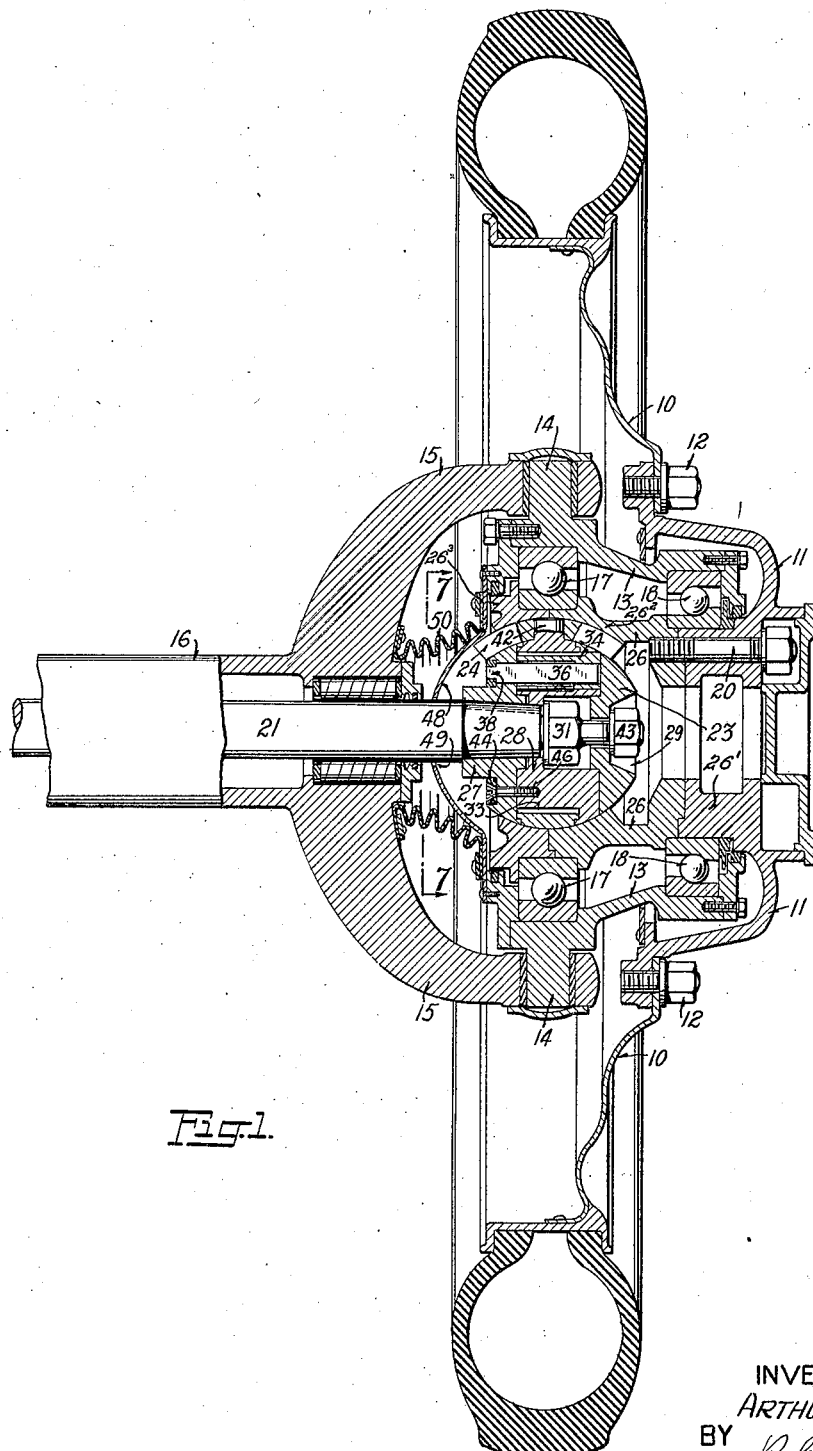
Figure 1 is a vertical sectional view of a front wheel assembly embodying a drive mechanism constructed in accordance with the present invention.

Fig. 6 an end elevation of the hub, looking from left to right in Figure 5, with the driving head assembled therein.

Fig. 7 is a view, on a smaller scale, taken along the line 7—7 of Figure 1.

Figs. 8 to 12 are details of parts included in the driving head.

The wheel assembly shown comprises a front axle 16 provided with the usual fork 15 embracing and supporting a carrier ring 13 in such manner as to permit the ring to swing about a substantially vertical axis. The ring, in this instance, is provided with trunnions 14 journaled in the fork 15 in the usual manner. A disk wheel of conventional form is shown at 10, removably attached by appropriate means such as bolts 12, to an inturned flange 11 carried by the outer end of the hub 26 to be later described. The arrangement is such that the pivotal axis of the trunnions 14 lies substantially within the plane of the wheel periphery.

The hub 26 is rotatably mounted within the carrier 13 upon two sets of roller bearings 17 and 18, spaced lengthwise of the hub. The inner set 17 is preferably disposed substantially within the plane of the wheel periphery so as to sustain the load on the wheel, the other set 18 being disposed outwardly a distance sufficient to insure coincidence between the axes of the hub and carrier. For easy assembly the hub is composed of three separable parts, an outer part 26' carrying the flange 11, an intermediate part 26² to which the part 26' is removably attached by appropriate means such as bolts 20, and an inner part 26³ removably attached to the intermediate part by appropriate means such as bolts 19. The intermediate and inner parts 26² and 26³ are internally fashioned to provide a fragmentary spherical seat 26⁴ for receiving a substantially cylindrical driving head 23 preferably such as will now be described.

The head 23 shown is also formed in three parts 27, 28 and 29. Part 27 is keyed or otherwise fixed to a drive shaft 21 journaled in the axle 16, part 28 is rigidly connected to part 27, through appropriate means such as screws 46, so as to rotate as a unit therewith, and part 29 is retained against part 28 by appropriate means such as a nut 43 threaded onto a reduced extension of the drive shaft. A nut 31 serves as an additional means for retaining the head on the drive shaft. The intermediate part 28 of the head carries a plurality of trunnions 42 equally spaced and projecting radially therefrom and lying in a plane normal to the axis of the drive shaft 21. Three of such trunnions are employed in this instance, each pivotally engaged in an arcuate slipper 24 closely fitted for lengthwise reciprocation in an appropriate groove 25 formed in the spherical seat 26⁴. Each groove 25 lies within a radial plane of the hub 26, and coacts with the corresponding trunnion and slipper assembly to establish a positive driving connection between the trunnions and hub.

During rotation of the drive shaft and wheel the trunnions 42 remain in a plane normal to the axis of the shaft, while the grooves 25 maintain a definite relation to the axis of the wheel, so that, with the wheel adjusted into an angular position such as that shown in Figure 2, there is a relative lengthwise reciprocation between the slippers 24 and grooves, and so that during such rotation the grooves reciprocate longitudinally with respect to the trunnions. It will be noted that the ends of the grooves are closer to the axis of the hub than the intermediate portions thereof, so that during this relative reciprocation between the grooves and trunnions, each trunnion alternately approaches and recedes from the axis of the hub during its circular travel about the axis of the shaft. This continuous variation in the effective driving radius between each trunnion and the hub obviously results in an irregular driving action therebetween. It will also be noted that the several grooves are not parallel, that is:—each lies in a great circle of the spherical surface and the ends of each thus converge toward the others—, so that the trunnions in following their respective grooves tend to approach and recede toward and from each other. These peculiar geometric relations are the direct cause of irregularities in the transmitted torque in universal joints heretofore designed, and the direct cause of a severe cramping action, with resultant excessive wear, that renders it impossible, in front wheel drives heretofore designed, to swing the wheel through more than a very limited angle.

In the device shown this difficulty is overcome by a combination and arrangement of parts permitting an automatic adjustment between the several trunnions 42 during rotation of the wheel. To this end each trunnion 42 is mounted upon an arcuate portion 39 of a three-part ring, slidably fitted within a continuous channel 33 formed in the periphery of the intermediate part 28 of the driving head. The three portions 39 are sufficiently spaced to permit limited movement therebetween within the channel. Each portion 39 is provided with rack teeth 41 on the inner face thereof which mesh with teeth 40, formed upon a plurality of cylindrical elements 34, rotatably fitted within appropriate sockets 32, formed in the intermediate part 28 of the head. Nine cylindrical elements are employed in the device shown, three of which cooperate with each portion 39. Each element 34 is yieldably held against rotation within its socket by any appropriate means such as a laminated spring 36 extending loosely through each element, with one end closely fitted in a rectangular slot 35 formed in one end of the element and the other end fitted in a similar slot 37 formed in the part 27 of the head. The several springs 36 are retained in working position by any appropriate means such as a ring 44, fixed to the part 27 by screws 46, and provided with openings 45 for receiving the reduced ends 38 of the springs. The torsional resistance of the several springs 36 yieldably resists rotation of the elements 34, and thereby yieldably resists movement of the trunnions relative to each other. These springs however yield sufficiently to avoid the cramping action hereinabove described and so function as to effect a smooth transmission of the driving torque from the head of the hub.

In the device shown the inner end of the carrier 13 is closed by an appropriate metal shield 48, fixed thereto and provided with a slot 49 to accommodate the shaft 21 in the various angular positions of the wheel. As an additional protection against the admission of dust and other foreign substance a flexible leather housing 50 of appropriate form is attached at its opposite ends to the adjacent faces of the fork 15 and shield 48.

Various changes may be made in the embodiment of the invention hereinabove specifically described without departing from the invention as defined in the appended claims.

I claim:

1. In a drive mechanism the combination of driving and driven members, a plurality of trunnions on one of said members, an arcuate element pivotally engaged with each trunnion, an arcuate groove in the other of said members for slidably receiving each element to thereby establish a driving connection between said members permitting an angular relation between the axes of rotation thereof, and yieldable means for normally maintaining a definite relation between said trunnions but permitting limited movement of said trunnions toward and from each other to automatically compensate for irregularities in the transmitted torque when said axes are angularly disposed relative to each other.

2. In a drive mechanism the combination of driving and driven members, a plurality of arcuate grooves in one of said members, elements projecting from said other member and engaged in said grooves to thereby establish a driving connection between said members permitting an angular adjustment between the axes of rotation thereof, and connections between said elements and said other member permitting slight relative adjustment between said elements toward and from each other to automatically compensate for irregularities in the transmitted torque when said axes are angularly disposed relative to each other.

3. In a drive mechanism the combination of driving and driven members, means including a plurality of elements carried by one of said members and engaged with said other member for maintaining a driving relation therebetween and permitting an angular adjustment between the axes of rotation thereof, and connections between said elements and one of said members permitting relative adjustment between said elements toward and from each other to automatically compensate for irregularities in the transmitted torque when said axes are angularly disposed relative to each other.

4. In a drive mechanism the combination of driving and driven members, and torque transmitting means between said members permitting relative angular adjustment between the axes of rotation thereof, said means comprising a plurality of elements on one of said members having a driving engagement with the other of said members and adjustable toward and from each other to automatically compensate for irregularities in the transmitted torque when said axes are angularly disposed relative to each other.

5. In a drive mechanism the combination of driving and driven members, a plurality of elements therebetween in positive driving engagement with one of said members and freely movable with respect thereto to permit angular adjustment between the axes of rotation of said members, and a yieldable driving connection between each of said elements and said other member permitting slight relative adjustment between said elements toward and from each other.

6. In a drive mechanism the combination of driving and driven members, a plurality of elements therebetween in positive driving engagement with one of said members but freely adjustable relative thereto to permit angular adjustment between the axes of rotation of said members, separate means for mounting each of said elements on said other member, and resilient connections between each mounting means and said other member for yieldably maintaining a definite spacing between said elements.

7. In a drive mechanism the combination of driving and driven members, a plurality of elements therebetween in positive driving engagement with one of said members but freely adjustable relative thereto to permit angular adjustment between the axes of rotation of said members, separate means for mounting each of said elements on said other member, a plurality of elements rotatably mounted in said other member each geared to one of said mounting means, and means for yieldably resisting rotation of said rotary elements to thereby yieldably maintain a definite relation between said first named elements and said other member.

8. In a drive mechanism a driving head having a plurality of driving elements adjustably mounted thereon, a plurality of rotary elements mounted in said head each geared to one of said driving elements, and a laminated spring associated with each rotary element to yieldably resist rotation thereof, each spring being engaged at one end with one of said rotary elements and at the other end with said head.

9. In a drive mechanism the combination of an axle, a drive shaft therein, a support mounted on said axle to swing about an axis intersecting the axis of said shaft, a wheel having a hub rotatable in said support, a substantially spherical head on shaft, a substantially spherical seat in said hub for receiving said head, a plurality of elements between said head and hub in positive driving engagement with said hub and freely adjustable relative thereto to permit swinging of said wheel and support, and yieldable driving connections between said elements and head yieldably maintaining a definite spacing between said elements.

In witness whereof, I hereunto subscribe my name this 23d day of July, 1926.

ARTHUR J. BAYLEY.